United States Patent
Takemura et al.

(10) Patent No.: US 7,168,402 B2
(45) Date of Patent: Jan. 30, 2007

(54) INTAKE VALVE CONTROL APPARATUS AND METHOD FOR AN INTERNAL COMBUSTION ENGINE

(75) Inventors: Shinichi Takemura, Yokohama (JP); Takanobu Sugiyama, Yokohama (JP); Shin Ishizaki, Kanagawa (JP); Ryosuke Hiyoshi, Kanagawa (JP); Tsuyoshi Arinaga, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 137 days.

(21) Appl. No.: 11/073,614

(22) Filed: Mar. 8, 2005

(65) Prior Publication Data
US 2005/0205029 A1    Sep. 22, 2005

(30) Foreign Application Priority Data
Mar. 18, 2004    (JP) .............................. 2004-077507

(51) Int. Cl.
  *F01L 1/34*    (2006.01)
(52) U.S. Cl. ............................... 123/90.15; 123/90.16; 123/90.17; 123/90.31
(58) Field of Classification Search ............. 123/90.15, 123/90.16, 90.17, 90.31
See application file for complete search history.

(56) References Cited

U.S. PATENT DOCUMENTS 6,401,675 B1    6/2002 Nakamura et al.
6,513,469 B2    2/2003 Nakamura et al.
6,575,128 B2*    6/2003 Nakamura et al. ........ 123/90.16

FOREIGN PATENT DOCUMENTS

| EP | 1 164 259 A1 | 12/2001 |
| EP | 1 403 487 A2 | 3/2004 |
| JP | 2002-256905 A | 9/2002 |

* cited by examiner

*Primary Examiner*—Thomas Denion
*Assistant Examiner*—Zelalem Eshete
(74) *Attorney, Agent, or Firm*—Foley & Lardner LLP

(57) ABSTRACT

An intake valve control apparatus for an internal combustion engine includes a first variable valve operating mechanism capable of varying an operation angle of an intake valve continuously, a second variable valve operating mechanism capable of varying a maximum lift phase of the intake valve continuously, and a controller that controls an intake air amount mainly by varying the operation angle and the maximum lift phase of the intake valve. The controller is configured to, when one of the first and second variable valve operating mechanisms is at a phase position different from a predetermined start stage phase position at engine start, correct a phase position of the other of the first and second variable valve operating mechanisms in accordance with a present phase position of the one of the first and second variable valve operating mechanisms. An intake valve control method is also provided.

34 Claims, 8 Drawing Sheets

FIG.3

| OPERATING CONDITION | VALVE LIFT CHARACTERISTICS | |
|---|---|---|
| IDLING (INCLUDING MIDDLE TO HIGH SPEED- EXTREMELY LOW LOAD CONDITION) | LIFT AND OPERATION ANGLE : EXTREMELY SMALL<br><br>PHASE : MOST RETARDED |  |
| LOW LOAD (INCLUDING IDLING UNDER LOAD OF ENGINE ACCESSORIES) | LIFT AND OPERATION ANGLE : EXTREMELY SMALL TO SMALL<br><br>PHASE : ADVANCED |  |
| MIDDLE LOAD | LIFT AND OPERATION ANGLE : SMALL<br><br>PHASE : MOST ADVANCED | 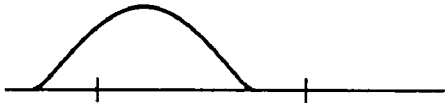 |
| HIGH LOAD LOW SPEED | LIFT AND OPERATION ANGLE : SMALL TO MIDDLE<br><br>PHASE : MOST RETARDED TO ADVANCED | 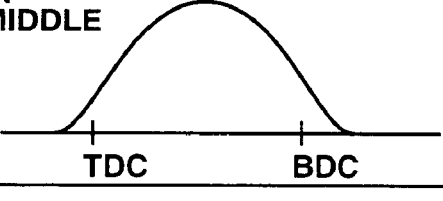 |
| HIGH LOAD MIDDLE SPEED | LIFT AND OPERATION ANGLE : MIDDLE<br><br>PHASE : MOST RETARDED TO ADVANCED | 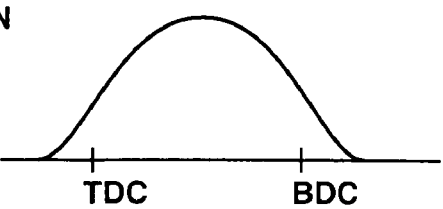 |
| HIGH LOAD HIGH SPEED | LIFT AND OPERATION ANGLE : LARGE<br><br>PHASE : MOST RETARDED TO ADVANCED | 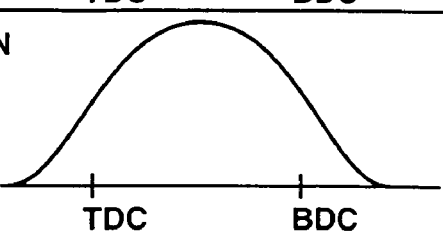 |

INTAKE VALVE CONTROL APPARATUS AND METHOD FOR AN INTERNAL COMBUSTION ENGINE

BACKGROUND OF THE INVENTION

The present invention relates to an intake valve control apparatus for an internal combustion engine, which comprises a first variable valve operating mechanism capable of varying an operation angle of an intake valve and a second variable valve operating mechanism capable of varying a maximum lift phase of an intake valve (a phase at which the lift of the intake valve becomes maximum or a center phase of an operation angle). The present invention further relates to an intake valve control method.

In a gasoline engine, an intake air amount is usually controlled by controlling an opening degree of a throttle valve disposed in an intake passage. However, as is well known, such a method is encountered by a problem that a large pumping loss is caused particularly at the time of a small opening degree of the throttle valve, i.e., at a low-to-middle load engine operating condition. To solve this problem, it has been tried to control the intake air amount by controlling the opening and closing timings and lift of the intake valve, without depending upon the control by the throttle valve.

An intake valve control apparatus consisting of a first variable valve operating mechanism (lift and operation angle varying mechanism) capable of varying a lift and operation angle simultaneously and continuously and a second variable valve operating mechanism (phase varying mechanism) capable of varying a maximum lift phase continuously and adapted to control the intake air amount by mainly varying the opening and closing timings of the intake valve is disclosed in Unexamined Japanese Patent Publication No. 2002-256905.

In such an intake valve control apparatus, the variable valve operating mechanisms are supplied with control target values in accordance with an engine operating condition and controlled based thereon.

SUMMARY OF THE INVENTION

In such a structure for controlling the intake air amount mainly by variable control of the operation angle and the maximum lift phase of the intake valve, there occurs such a case in which the engine cannot be started by cranking or there is a difficulty in starting the engine by cranking unless the valve lift characteristics that are determined based on the operation angle and the maximum lift phase are held suitable for starting. For example, in such an apparatus having two variable valve operating mechanisms, when the engine is in a partial-load operating range, the operation angle is controlled to be comparatively small while the maximum lift phase being controlled to be at an advanced phase position. The closing timing of the intake valve is thus advanced largely from the BDC (Bottom Dead Center). Under such an engine operating condition, if the engine is suddenly stopped due to engine stall, there may occur such a case in which the operation angle or the maximum lift phase cannot be returned to such a predetermined operation angle or a predetermined maximum lift phase that can attain predetermined starting characteristics. In such a case, the intake valve closing timing is advanced more than the timing suited for starting, thus causing a possibility that a suitable effective compression ratio cannot be attained by cranking at engine start and therefore the engine cannot be started.

It is accordingly an object of the present invention to provide an intake valve control apparatus for an internal combustion engine which is free from the above-described problem inherent in the prior art apparatus.

It is a further object of the present invention to provide an intake valve control method that is carried out by the intake valve control method.

According to an aspect of the present invention, there is provided an intake valve control apparatus for an internal combustion engine comprising a first variable valve operating mechanism capable of varying an operation angle of an intake valve continuously, a second variable valve operating mechanism capable of varying a maximum lift phase of the intake valve continuously, and a controller that controls an intake air amount mainly by varying the operation angle and the maximum lift phase of the intake valve, the controller being configured to, when one of the first and second variable valve operating mechanisms is at a phase position different from a predetermined start stage phase position at engine start, correct a phase position of the other of the first and second variable valve operating mechanisms in accordance with a present phase position of the one of the first and second variable valve operating mechanisms.

According to another aspect of the present invention, there is provided an intake valve control apparatus for an internal combustion engine comprising a first variable valve operating mechanism capable of varying an operation angle of an intake valve continuously, a second variable valve operating mechanism capable of varying a maximum lift phase of the intake valve continuously, and a controller that controls an intake air amount mainly by varying the operation angle and the maximum lift phase of the intake valve, the controller being configured to, when a valve closing timing of the intake valve is on an advance side of a predetermined start stage point at engine start, increase-correct an operation angle of the first variable valve operating mechanism and retard-correct a maximum lift phase of the second variable valve operating mechanism.

According to a further aspect of the present invention, there is provided an intake valve control apparatus for an internal combustion engine comprising a first variable valve operating mechanism capable of varying an operation angle of an intake valve continuously, a second variable valve operating mechanism capable of varying a maximum lift phase of the intake valve continuously, and a controller that controls an intake air amount mainly by varying the operation angle and the maximum lift phase of the intake valve, the controller being configured to, when a valve closing timing of the intake valve is on a retard side of a predetermined start stage point at engine start, decrease-correct an operation angle of the first variable valve operating mechanism and advance-correct a maximum lift phase of the second variable valve operating mechanism.

According to a further aspect of the present invention, there is provided an intake valve control method for an internal combustion engine having a first variable valve operating mechanism capable of varying an operation angle of an intake valve continuously and a second variable valve operating mechanism capable of varying a maximum lift phase of the intake valve continuously, comprising controlling an intake air amount mainly by varying the operation angle and the maximum lift phase of the intake valve, wherein the controlling includes, when one of the first and second variable valve operating mechanisms is at a phase position different from a predetermined start stage phase position at engine start, correcting a phase position of the other of the first and second variable valve operating mechanisms in accordance with a present phase position of the one of the first and second variable valve operating mechanisms.

BRIEF DESCRIPTION OF THE DRAWINGS

FIG. 3 is a characteristic view showing valve lift characteristics under a typical engine operating condition;

DESCRIPTION OF THE PREFERRED EMBODIMENTS

Figure 1:
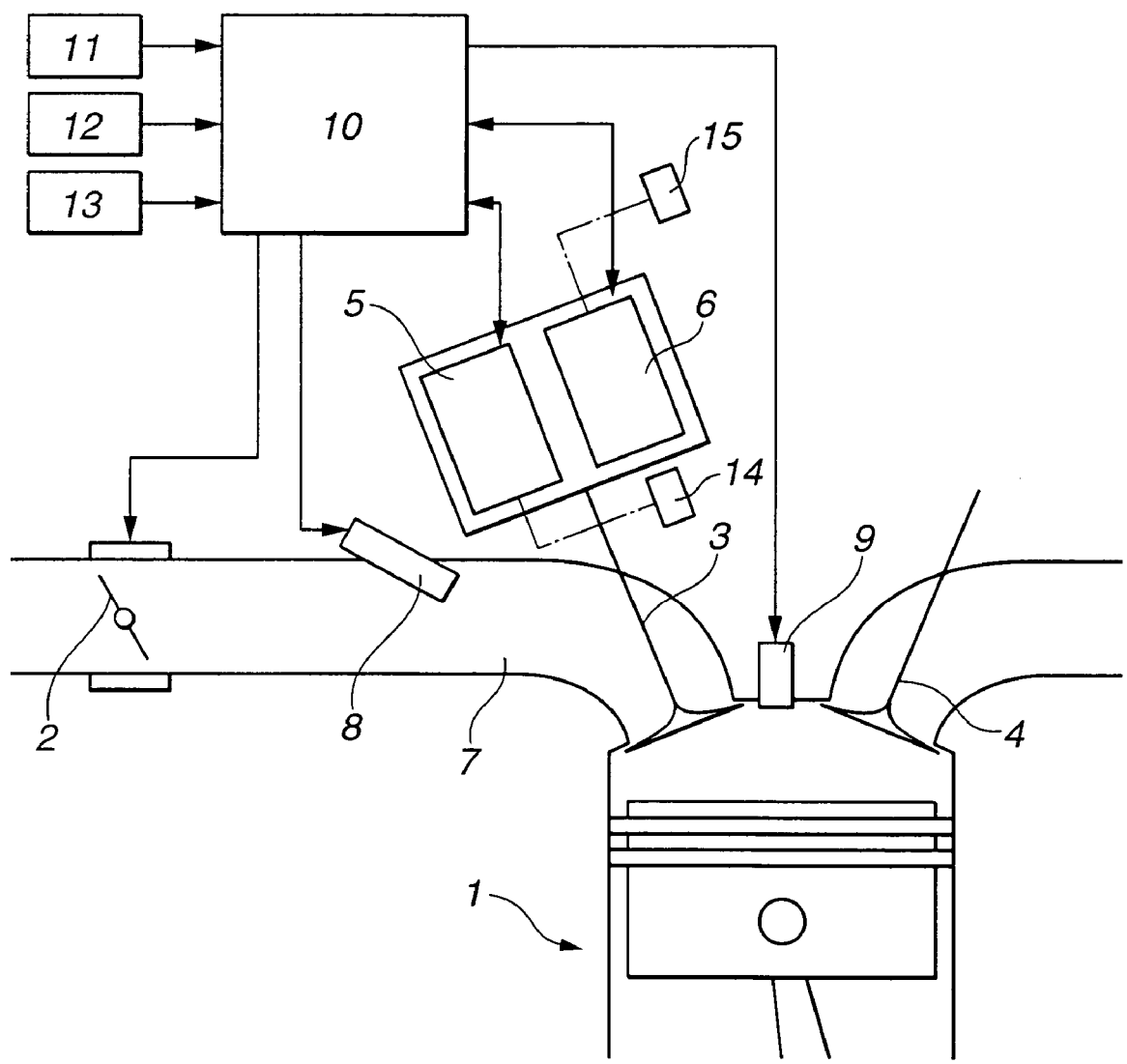
FIG. 1 is a schematic systematic view of an intake valve control apparatus for an internal combustion engine, to which the present invention is applied.

Referring first to FIG. 1, an internal combustion engine is generally indicated by 1 and includes intake valve 3 and exhaust valve 4. An intake valve control apparatus includes first variable valve operating mechanism (VEL) 5 capable of varying (increasing or decreasing) a lift and operation angle of intake valve 3 continuously and second variable valve operating mechanism (VTC) 6 capable of varying (advancing or retarding) a center phase of an operation angle of intake valve 3 continuously. Further, at intake passage 7 is dispose electronically controlled throttle valve 2 whose opening degree is controlled by an actuator such as a motor. In this connection, throttle valve 2 is used only for producing a small vacuum (e.g., −50 mmHg) that is required for blow-by gas processing and the intake air amount is basically or mainly controlled by varying the valve lift characteristics of intake valve 3 by means of first and second variable valve operating mechanisms 5, 6. An actual throttleless operation in which the intake air amount is controlled without depending upon the opening degree of throttle valve 2 is thus realized by first and second variable valve operating mechanisms 5, 6. First and second variable valve operating mechanisms 5, 6 and electronically controlled throttle valve 2 are controlled by control unit 10.

Further disposed at intake passage 7 is fuel injection valve 8 from which is injected an amount of fuel that is determined in accordance with an intake air amount. The intake air amount is controlled by intake valve 3 as described above. Accordingly, the output of internal combustion engine 1 is controlled by controlling the intake air amount by means of first and second variable valve operating mechanisms 5, 6.

Inputted to control unit 10 are an accelerator opening degree signal APO from accelerator opening degree sensor 11 that is disposed at an accelerator pedal (not shown) operated by a vehicle driver, an engine speed signal Ne from engine speed sensor 12, an intake air amount signal from intake air amount sensor 13, etc. Control unit 10 calculates, based on the signals described above, a fuel injection amount, ignition timing, throttle valve opening degree, operation angle target value, maximum lift phase target value, etc. and controls fuel injection valve 8, ignition plug 9, throttle valve 2, first and second variable valve operating mechanisms 5, 6, etc. Further, though not shown, a starter motor is provided, and control unit 10 executes a predetermined engine start control including cranking in response to an input signal from a starter switch or key switch (not shown).

Figure 2:
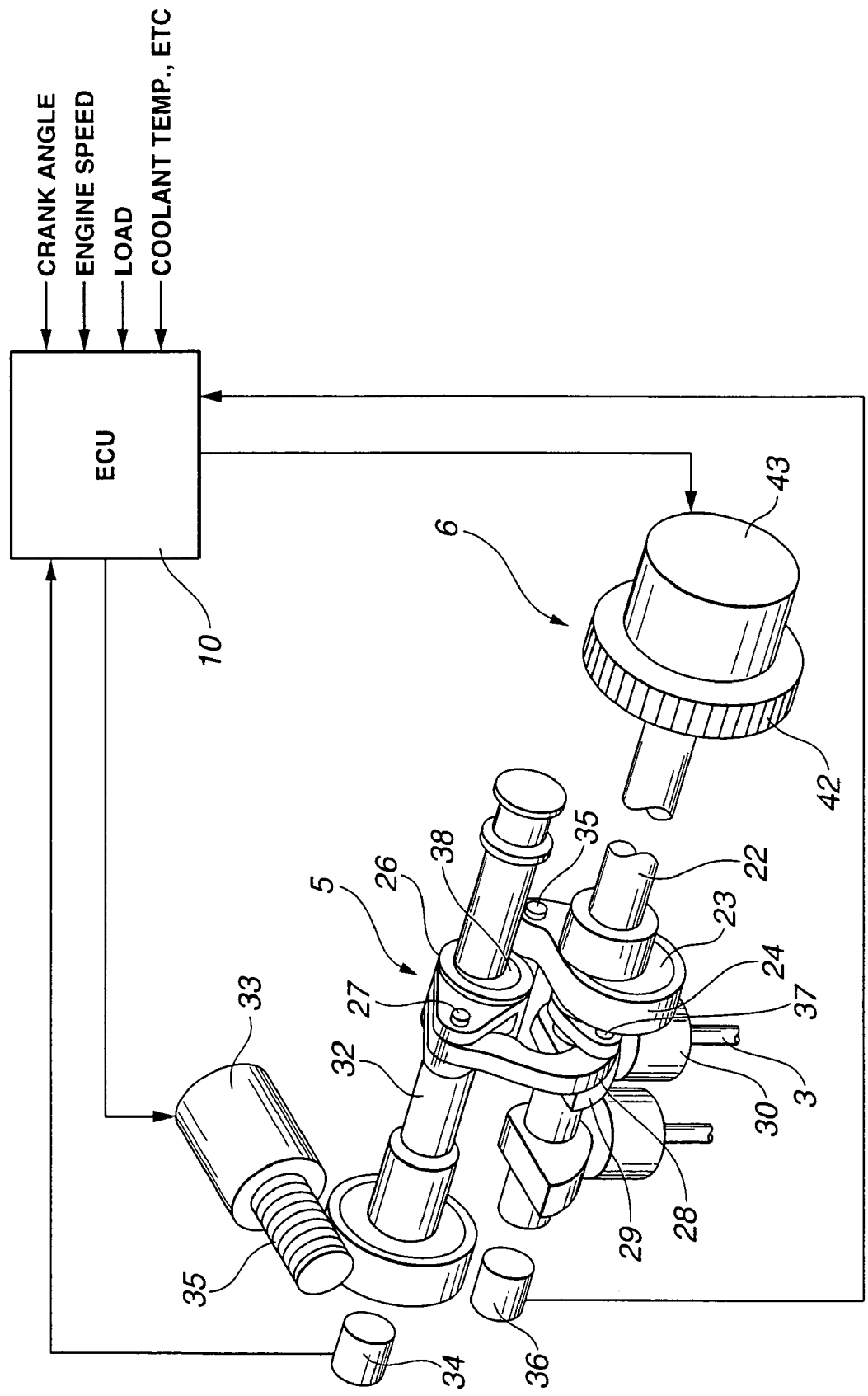
FIG. 2 is a perspective view of variable valve operating mechanisms employed in the intake valve control apparatus of FIG. 1.

First and second variable valve operating mechanisms 5, 6 are known and have, for example, substantially the same mechanical structure as those disclosed in Unexamined Japanese Patent Publication No. 2002-256905. Accordingly, first and second variable valve operating mechanisms 5, 6 will be described briefly with reference to FIG. 2.

Variable valve operating mechanism 5 for variably controlling the lift and operation angle of intake valve 3 includes drive shaft 22 driven by a crankshaft (not shown) of engine 1, circular drive cam 23 eccentrically and fixedly mounted on drive shaft 22 so as to be rotatable together with drive shaft 22, pivotal link 24 pivotally mounted on drive cam 23, control shaft 32 rotatably supported on a cylinder head (not shown) of engine 1, circular control cam 38 eccentrically and fixedly mounted on control shaft 22 so as to be rotatable together with control shaft 22, rocker arm 26 pivotally mounted on control cam 38 and having an end portion pivotally connected to a protruded arm portion of pivotal link 24 by way of connecting pin 35, oscillation cam 29 fixedly mounted on drive shaft 22 for driving intake valve 3 by way of valve lifter 30, and connecting link 28 having an upper end portion pivotally connected to another end portion of rocker arm 26 by way of connecting pin 27 and a lower end portion pivotally connected to oscillation cam 29 by way of connecting pin 37.

Drive cam 23 has a cylindrical outer periphery which is eccentric with drive shaft 22. Control cam 38 has a cylindrical outer periphery which is eccentric with control shaft 32. Accordingly, an oscillation center of rocker arm 26 varies depending upon a variation of an angular position of control shaft 32.

Oscillation cam 29 has at a lower side thereof a basic circular surface and a cam surface extending continuously from the basic circular surface so as to generate a predetermined curve. The basic circular surface and cam surface are selectively brought into contact with the upper surface of valve lifter 30 in dependence upon an oscillated position of oscillation cam 29. The basic circular surface defines a reference circular range for making the valve lift zero. When oscillation cam 29 is oscillated to bring the cam surface into contact with valve lifter 30, intake valve 3 is pushed down against a valve spring reaction force to lift intake valve 3 gradually.

Actuator 33 for control of lift and operation angle is disposed at an end of control shaft 32. Control shaft 32 is driven by actuator 33 so as to be rotatable within a predetermined angular range. Actuator 33, for example, consists of an electric motor for driving control shaft 32 by way of worm gear 35 and is controlled by a control signal supplied thereto from control unit 10. The angular position of control shaft 32 is detected by control shaft sensor 34.

By first variable valve operating mechanism 5 described above, the lift and operation angle of intake valve 3 are both varied simultaneously and continuously depending upon a variation of the angular position of control shaft 32. Depending upon a variation of the lift and operation angle, the opening and closing timings of intake valve 3 are varied symmetrically about the maximum lift phase or the center phase of the operation angle. The amount of lift and operation angle is determined simply by the angular position of control shaft 32 so that the detection value of control shaft sensor 34 represents the actual lift and operation angle at that time.

In the meantime, in this embodiment, a minimum lift and operation angle corresponds to a start stage lift and operation angle (i.e., a lift and operation angle that should be attained at engine start for attaining valve lift characteristics suitable for starting). Accordingly, there is provided a holding mechanism 14 consisting of a lock pin, etc. for holding control shaft 32 at an angular position where the lift and operation angle become minimum. The lock pin of holding mechanism 14 is, for example, lockingly engaged with control shaft 32 when control shaft 32, after stoppage of engine 1, is driven into an angular position where the lift and operation angle become minimum and disengaged therefrom by means of a solenoid or the like after complete combustion of engine.

On the other hand, variable valve operating mechanism 6 for variably controlling the maximum lift phase of intake valve 3 includes sprocket 42 disposed at a front end of control shaft 22 and phase control actuator 43 for causing sprocket 42 and drive shaft 22 to rotate relative to each other within a predetermined angular range. Sprocket 42 is connected to the crankshaft by way of a timing chain or belt (not shown) so as to be rotatable in timed relation with the crankshaft. Phase control actuator 43 in this embodiment is constituted by a hydraulic rotary actuator and controlled by a hydraulic control valve (not shown) in response to a control signal from control unit 10. By the operation of phase control actuator 43, sprocket 42 and drive shaft 22 are rotated relative to each other to thereby advance or retard the maximum lift phase of intake valve 3. In this connection, the lift characteristic curve itself is not changed but is moved in its entirety so as to allow the maximum lift phase to advance or retard. Further, the maximum lift phase is also varied continuously. The controlled condition of second variable valve operating mechanism 6 is detected by drive shaft sensor 36 that is responsive to the angular position of control shaft 22.

In this embodiment, the most retarded maximum lift phase is used as a start stage maximum lift phase (i.e., a maximum lift phase that should be attained at engine start for attaining valve lift characteristics suitable for starting). Accordingly, within phase control actuator 43 is disposed holding mechanism 15 consisting of a lock pin or the like for holding sprocket 42 and drive shaft 22 at such positions that cause the maximum lift phase to retard maximumly. The lock pin constituting holding mechanism 15 is engaged with control shaft 22 when control shaft 22 is rotated relative to sprocket 42 into a maximumly retarded position and disengaged therefrom when hydraulic pressure is supplied to holding mechanism 15 after start of engine 1.

FIG. 3 shows valve lift characteristics of intake valve under a representative engine operating condition. As shown, in an extremely low load range including idling, the lift and operation angle become minimum and the maximum lift phase is placed at a most advanced phase position. By this, the closing timing occurs at a point immediately before the BDC. In this embodiment, the valve lift characteristics for start stage are the same as those for idling stage so that cranking is performed under the minimum operation angle that is used as the start stage operation angle and under the most retarded maximum lift phase that is used as the start stage maximum lift phase.

In a low load range (including idling under a load of engine accessories) that is larger in load than an extremely low load range including idling, the lift and operation angle becomes large and the maximum lift phase is placed at an advanced phase position. In this instance, by advancing the intake valve closing timing, the intake air amount is controlled to be relatively small.

In a middle load range in which the load is increased further and combustion becomes stable, the lift and operation angle is increased further and the maximum lift phase is advanced. The maximum lift phase is most advanced at a certain point in the middle load range.

Further, at maximum load, second variable valve operating mechanism 6 is controlled so that the lift and operation angle are increased further and the valve timings become optimum. In the meantime, as shown, the optimum valve lift characteristics vary depending upon a variation of engine speed.

Then, the control by the intake valve control apparatus at engine start will be described.

Figure 4:
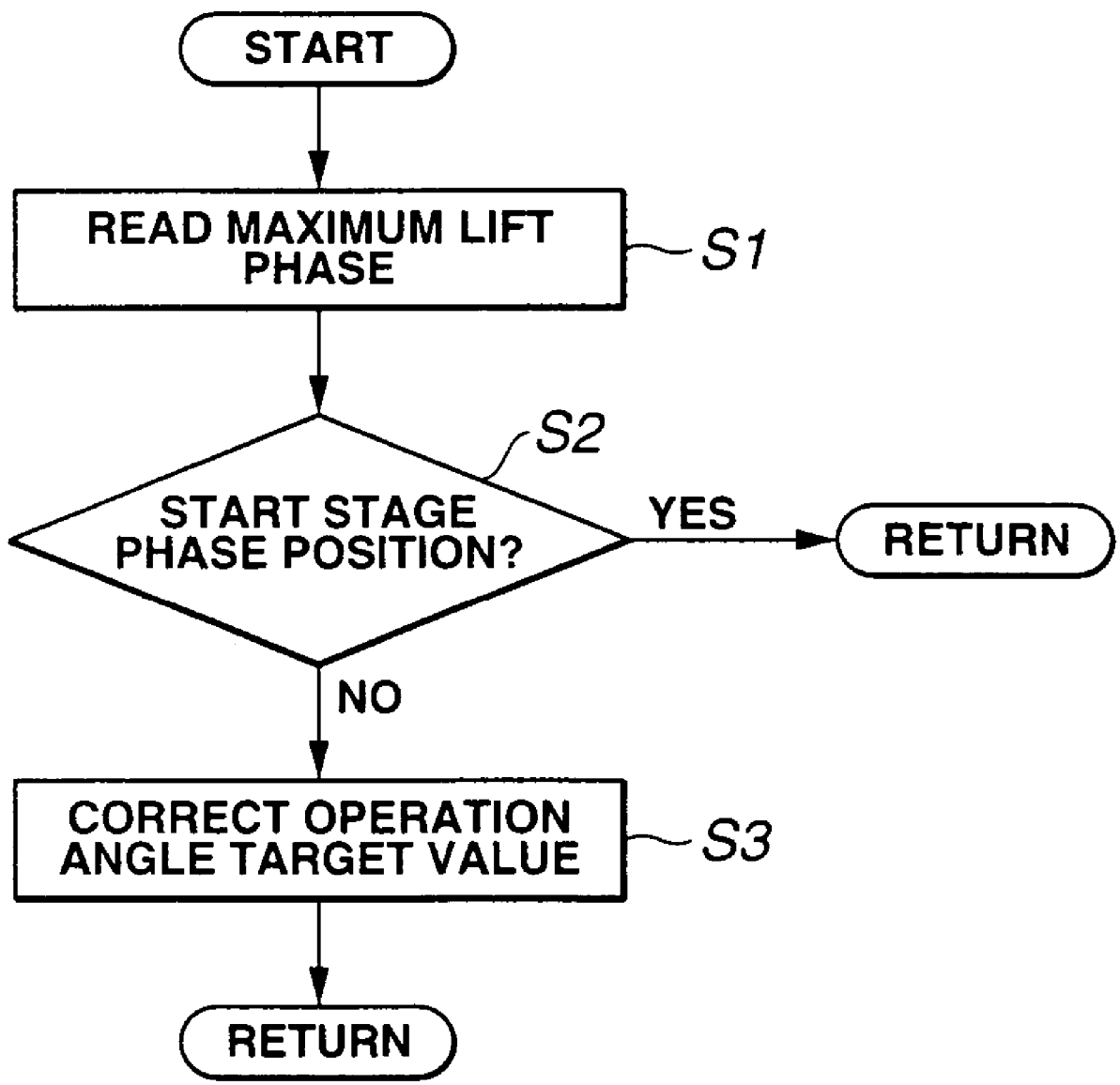
FIG. 4 is a flowchart showing a correction control at engine start according to a first embodiment of the present invention.

FIG. 4 is a flowchart showing a control at engine start according to a first embodiment of the present invention. When the key switch (not shown) is turned through an ON position into a start position, cranking by a starter motor is started and the control routine of FIG. 4 is started. In step S1, the maximum lift phase at that time, i.e., the phase position of second variable valve operating mechanism 6 at that time is read. In step 2, it is determined whether or not the maximum lift phase is at a predetermined start stage phase position (i.e., most retarded phase position), i.e., it is determined whether or not second variable valve operating mechanism 6 is at a predetermined start stage phase position. In this connection, if the maximum lift phase is not at the start stage phase position, i.e., at the most retarded phase position, the control proceeds to step S3 where correction of the operation angle, more specifically, increase-correction of the operation angle is performed. The more the actual maximum lift phase is deviated from the start stage maximum lift phase position, the more the correction amount is increased.

Figure 5:
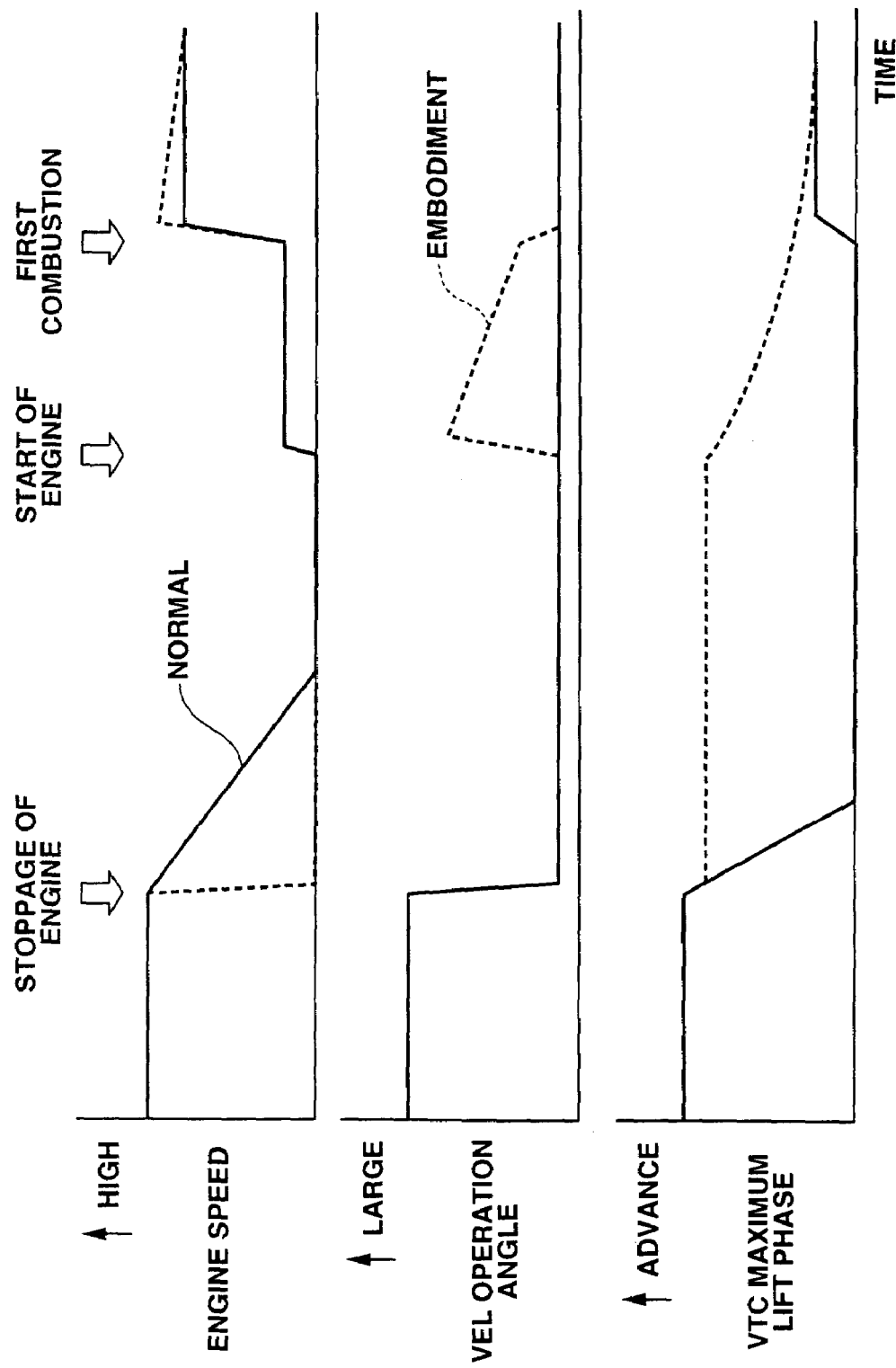
FIG. 5 is a time chart showing the correction control of the first embodiment.

FIG. 5 shows a time chart of the operation of the first embodiment and comparatively shows variations of the engine speed, operation angle and maximum lift phase when the engine is restarted after once stopped. In this instance, the solid line indicates a normal operation and the dotted line indicates an abnormal operation to which the processing of this embodiment is applied.

At stoppage of engine, the engine speed decreases normally gradually to some extent as indicated by the solid line. Thus, even if the maximum lift phase is at an advanced phase position immediately before stoppage of engine, second variable valve operating mechanism 6 is retarded gradually due to cam torque variations to which it is subjected and reaches the most retarded phase position before rotation of internal combustion engine 1 stops completely. Further, first variable valve operating mechanism 5 is always urged by the valve spring reaction force in the direction to decrease the lift and operation angle and therefore caused to attain the minimum operation angle rapidly after stoppage of engine. Accordingly, next start of engine is normally performed under such a minimum operation angle and most retarded maximum lift phase.

In contrast to this, at engine stoppage due to engine stall, rotation of the engine stops rapidly as indicated by the dotted line so that there may possibly occur such a case in which second variable valve operating mechanism 6 does not return to the phase position where the maximum lift phase is most retarded but stops in a state of the maximum lift phase being advanced. In such a case, if second variable valve operating mechanism 6 remains as it is, a predetermined effective compression ratio cannot be attained at restart of the engine and therefore the startability is deteriorated. According to the present invention, the operation angle is increase-corrected at cranking as indicated by the dotted line so that the intake valve closing timing is caused to go closer to the BDC, thereby improving the startability. In the meantime, the control of the operation angle and the maximum lift phase is started together with cranking so that the actual maximum lift phase is moved toward a proper target value after cranking is started. In the meantime, first variable valve operating mechanism 5 that varies the operation angle is controlled by an electric motor and therefore can vary the operation angle assuredly even under the condition where the hydraulic pressure is low.

Figure 6:
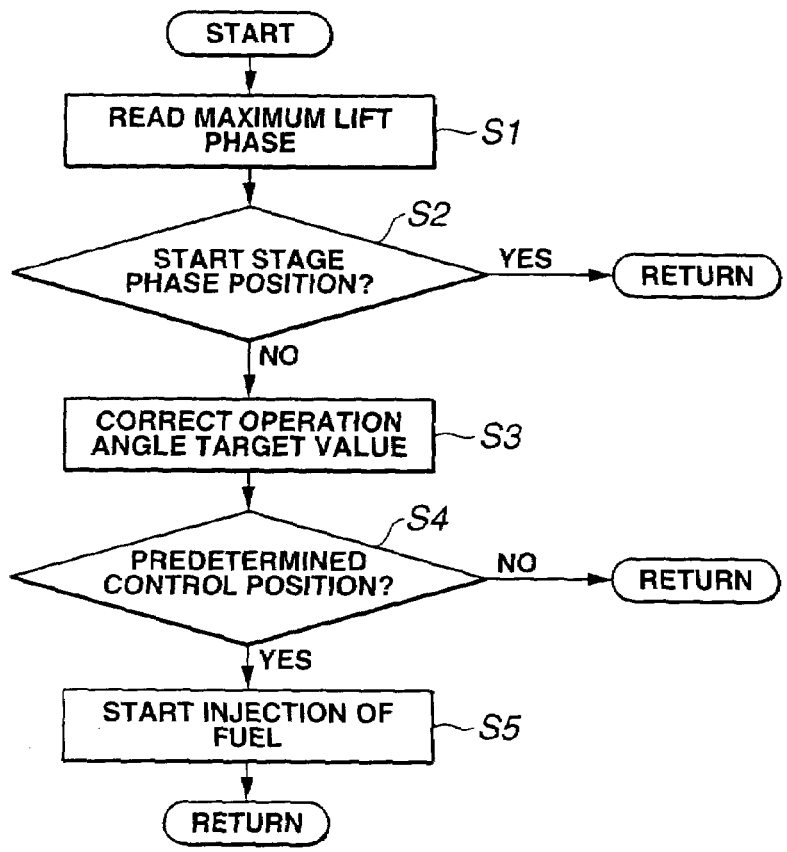
FIG. 6 is a flowchart showing a variation of the correction control of the first embodiment.

FIG. 6 shows a variant of the first embodiment. In step S3, increase-correction of the operation angle is started. Then, in step S4, it is determined whether or not the operation angle has reached a predetermined value, i.e., whether the phase position of variable valve operating mechanism 5 has reached a predetermined control position. If it is determined that the phase position of variable valve operating mechanism 5 has reached the predetermined control position, the control proceeds to step S5 where injection of fuel is started. In other words, until increase-correction of the operation angle is completed to some extent, injection of fuel is inhibited. By this, it becomes possible to prevent the exhaust gas composition from being deteriorated and the startability from being deteriorated due to excessively rich air/fuel mixture.

Figure 7:
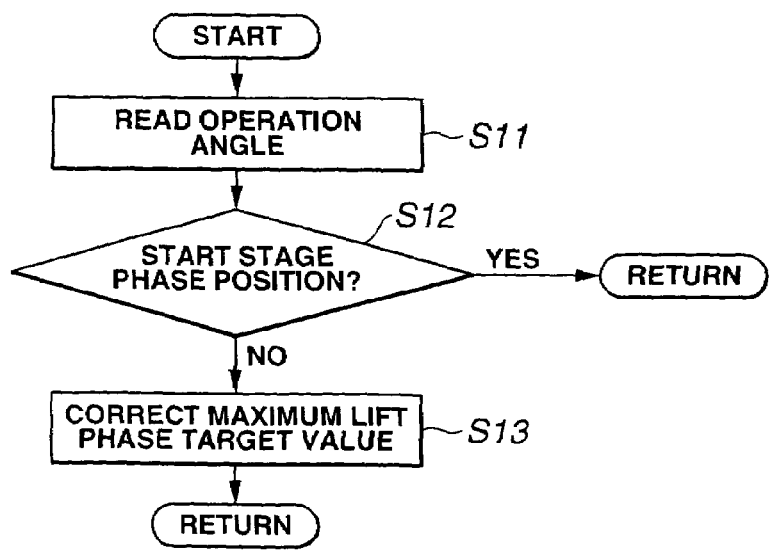
FIG. 7 is a flowchart showing a correction control at engine start according to a second embodiment of the present invention.

FIG. 7 is a flowchart showing a control at engine start according to a second embodiment. In step S11, the operation angle at that time, i.e., the phase position of first variable valve operating mechanism 5 at that time is read. In step S12, it is determined whether or not the operation angle is a predetermined start stage operation angle (i.e., minimum operation angle), i.e., it is determined whether or not first variable valve operating mechanism 5 is at a predetermined start stage phase position. In this instance, if the operation angle is not the predetermined start stage operation angle, i.e., not the minimum operation angle, the control proceeds to step S3 where correction of the operation angle, more specifically, increase-correction of the operation angle is performed. The more the actual operation angle is deviated from the operation angle at engine start, the more the correction amount is increased.

Figure 8:
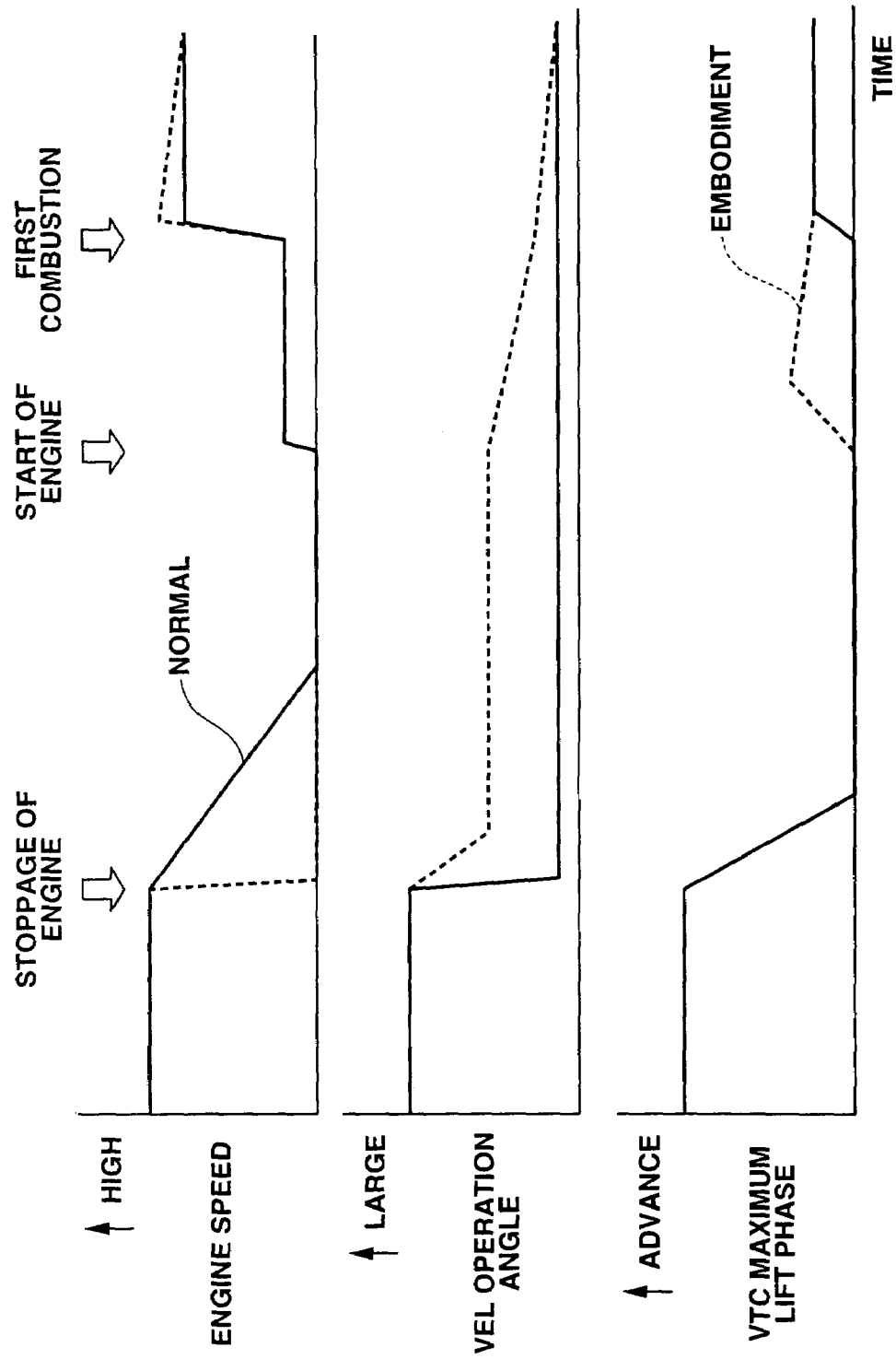
FIG. 8 is a time chart showing the correction control of the second embodiment.

FIG. 8 is a time chart of an operation of second embodiment 6 and comparatively shows variations of the engine speed, operation angle and maximum lift phase when the engine is restarted after once stopped. The normal operation is indicated by the solid line, while the abnormal operation to which the processing of this embodiment is applied is indicated by the dotted line.

By this example is shown a case in which at engine stoppage due to engine stall, first variable valve operation mechanism 5 cannot return to the proper minimum operation angle position due to friction or the like. In such a case, if first variable valve operation angle 5 is held as it is without being subjected to any processing, the intake valve closing timing is excessively delayed from the BDC and a predetermined effective compression ratio is also not attained at restart of engine, thus deteriorating the engine startability. In contrast to this, by the present invention, the maximum lift phase is advance-corrected during cranking as indicated by the dotted line for thereby making the intake valve closing timing go closer to the BDC. By this, a good engine startability is attained. In the meantime, start of cranking causes the friction coefficient of first variable valve operating mechanism 5 to decrease so that the actual operation angle starts moving toward the proper target value after start of cranking.

Figure 9:
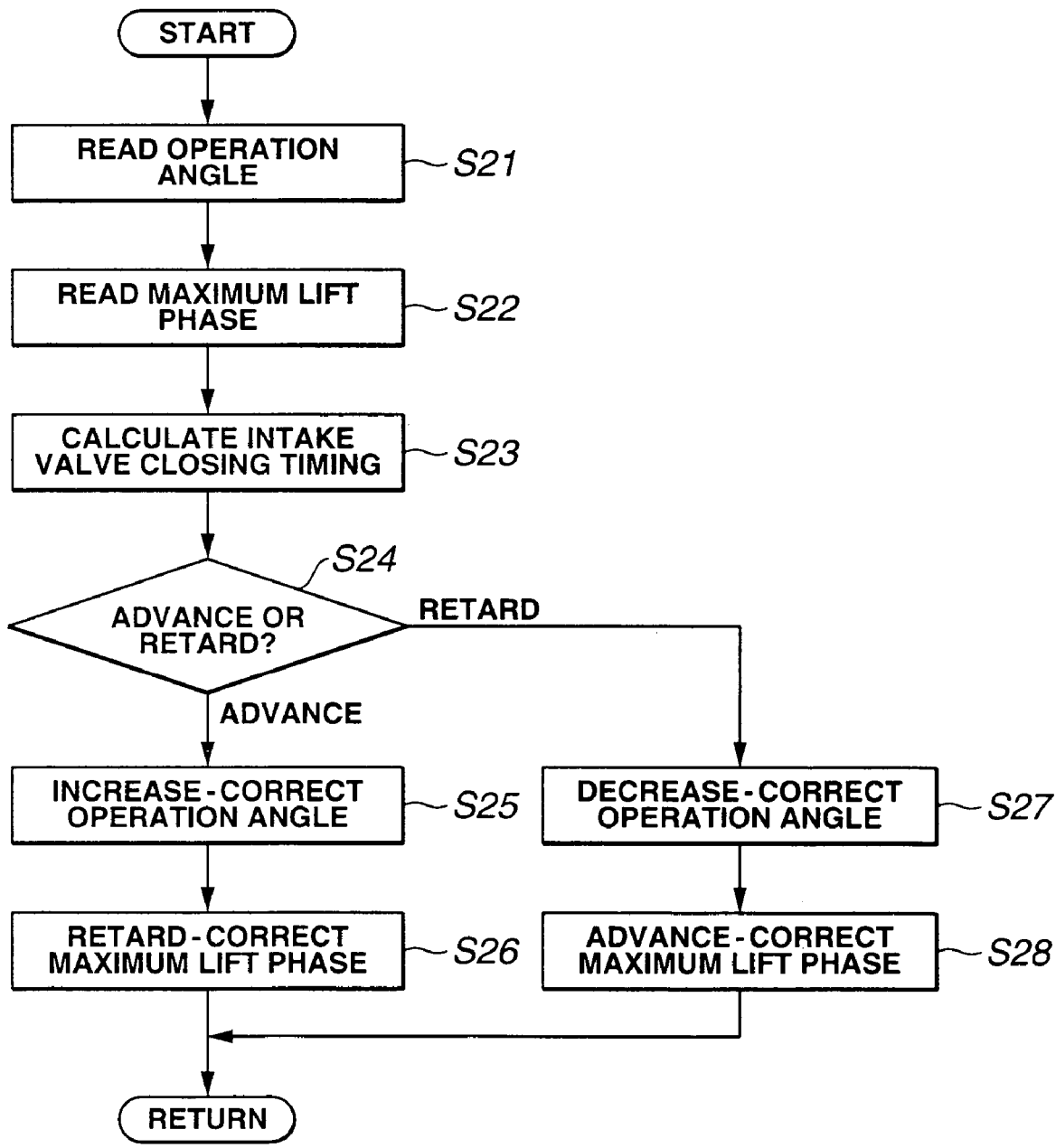
FIG. 9 is a flowchart showing a correction control at engine start according to a third embodiment of the present invention.

FIG. 9 is a flowchart showing a control at engine start according to a third embodiment. In the third embodiment, the operation angle and the maximum lift phase are read at engine start (steps S21, S22). From the relation between them is calculated the intake valve closing timing (S23). In step S24, by comparing the thus estimated intake valve closing timing with a predetermined start stage closing timing, it is determined whether the estimated intake valve closing timing is on the advance side or on the retard side of the predetermined start stage closing timing. In the meantime, in place of the operation angle and the maximum lift phase at engine start, that are to be read in steps 21, 22, can be used the values that are read and stored at last stoppage of engine 1.

If it is determined in step S24 that the intake valve closing timing is deviated to the advance side, the control proceeds to step S25 where the operation angle target value is increase-corrected and then to step S26 where the maximum lift phase is retard-corrected. By this, the actual intake valve closing timing is retarded and caused to go closer to the proper closing timing at engine start. On the other hand, if it is determined in step S24 that the intake valve closing timing is deviated to the retard side, the control proceeds to step S27 where the operation angle target value is decrease-corrected and to the step S28 where the maximum lift phase is advance-corrected. By this, the actual intake valve closing timing is advanced and caused to go closer to the proper closing timing at engine start. Accordingly, a proper effective compression ratio is attained, thus enabling assured engine start.

From the foregoing, it will be understood that an important feature of the present invention resides in utilizing the fact that the operation angle and the maximum lift phase are controlled by the first and second variable valve operating mechanisms and control, when the phase position of one of the variable valve operating mechanisms is deviated from a predetermined start stage phase position, the other of the valve operating mechanisms so that the valve lift characteristics go closer to those necessary for engine start.

For example, if the operation angle differs from a predetermined start stage operation angle when the engine is to be started, the operation angle is corrected in accordance with a present maximum lift phase. For example, if the present operation angle is on the advance side of the predetermined start stage operation angle, the operation angle is increase-corrected. In this instance, it is preferable to control the operation angle so that the larger the difference between the present maximum lift phase and the predetermined start stage operation angle becomes, the lager the increase-correction amount of the operation angle becomes.

The start stage operation angle is generally set small. Thus, if the maximum lift phase is advanced more than the start stage maximum lift phase, the intake valve closing timing is excessively advanced from the BDC, thus disabling to attain an effective compression ratio necessary for engine start. In contrast to this, according to the present invention, the operation angle is increase-corrected to cause the intake valve closing timing to go closer to the BDC, thus causing the effective compression ration to become higher.

In this connection, the operation angle after increase-correction thereof may be limited to a predetermined operation angle smaller than the maximum operation angle of the first variable valve operating mechanism. If the operation angle is increase-corrected under a condition of the maximum lift phase being advanced, there can possibly occur such a case in which the intake valve closing timing is advanced largely from the TDC (Top Dead Center). Thus, it is desirable to limit the operation angle after correction for avoiding an excessive valve overlap and an interference between a piston and an intake valve.

Further, the most retarded maximum lift phase of the first variable valve operating mechanism at the most retarded phase position can be determined as the start stage maximum lift phase. It is desirable that the intake valve control apparatus is provided with a holding mechanism for fixedly holding the second variable valve operating mechanism at the most retarded phase position during engine stoppage. As the holding mechanism can be used a lock pin or the like that is disengaged in response to oil pressure that is generated when the engine is started.

The maximum lift phase at engine start may be detected actually at engine start. Otherwise, the maximum lift phase at engine stoppage may be stored in a memory device and the maximum lift phase stored in the memory device is regarded as the present maximum lift phase to perform correction of the operation angle. In this instance, without waiting for detection of the actual position, it is possible to start correction of the operation angle.

On the other hand, it is possible, when the operation angle differs from the predetermined start stage operation angle, to correct the maximum lift phase in accordance with the present operation angle.

For example, if the present operation angle is larger than the start stage operation angle, correction of the maximum lift phase is performed. In this instance, it is desirable to correct the maximum lift phase so that the larger the difference between the present operation angle and the start stage operation angle becomes, the larger the advance-correction amount of the maximum lift phase becomes. For example, in case the intake valve closing timing is set by the start stage operation angle and the start stage maximum lift phase so as to be adjacent the BDC, an operation angle larger than the start stage operation angle causes the intake valve closing timing to be excessively delayed contrary to the case described above, thus lowering the effective compression ratio. In contrast to this, according to the present invention, the maximum lift phase is advance-corrected to cause the intake valve closing timing to go closer to the BDC, thus making higher the effective compression ratio.

In this instance, the operation angle after the advance correction may be limited so as to be within a predetermined advance range on the retard side of the most advanced maximum lift phase of the second variable valve operating mechanism. If the maximum lift phase is advance-corrected under a condition of the operation angle being large, there may possibly occur such a case in which the intake valve closing timing is largely advanced from the TDC. Thus, it is desirable to limit the maximum lift phase after correction so as to avoid an excessively large valve overlap and an interference between a piston and an intake valve.

Further, the minimum operation angle of the first variable valve operating mechanism can be regarded as the above-described start stage operation angle. It is desirable the intake valve control apparatus is provided with a holding mechanism for fixedly holding the first variable valve operating mechanism at the minimum operation angle position during engine stoppage. As the holding mechanism can be used a lock pin or the like that is disengaged in response to oil pressure that is generated when the engine is started.

The operation angle at engine start may be detected actually at engine start. Otherwise, the operation angle at engine stoppage may be stored in a memory device and the operation angle stored in the memory device is regarded as the present operation angle to perform correction of the maximum lift phase. In this instance, without waiting for detection of the actual position, it is possible to start correction of the maximum lift phase.

In the present invention, it is desirable to perform correction of the phase positions of the variable valve operating mechanisms during cranking by a starter motor. Even if the first and second variable valve operating mechanisms are in a condition of being not easily movable due to static friction coefficient of each section of the mechanisms before cranking, the mechanisms becomes smoothly movable during cranking and can be rapidly put into a condition of being ready for engine start.

During cranking, it is desirable to inhibit injection of fuel for a predetermined period of time after correction of the position of the variable valve operating mechanism is started. By this, deterioration of the startability due to increase in the amount of unburnt fuel and excessively rich air/fuel mixture can be avoided.

A further feature of the present invention is to perform correction of both the first and second variable valve operating mechanisms based on the intake valve closing timing at engine start, that is determined by the operation angle and the maximum lift phase.

The entire contents of Japanese Patent Application P2004-77507 (filed Mar. 18, 2004) are incorporated herein by reference. The scope of the invention is defined with reference to the following claims.

What is claimed is:

1. An intake valve control apparatus for an internal combustion engine comprising:
   a first variable valve operating mechanism capable of varying an operation angle of an intake valve continuously;
   a second variable valve operating mechanism capable of varying a maximum lift phase of the intake valve continuously; and
   a controller that controls an intake air amount mainly by varying the operation angle and the maximum lift phase of the intake valve;
   the controller being configured to, when one of the first and second variable valve operating mechanisms is at a phase position different from a predetermined start stage phase position at engine start, correct a phase position of the other of the first and second variable valve operating mechanisms in accordance with a present phase position of the one of the first and second variable valve operating mechanisms.

2. An intake valve control apparatus according to claim 1, wherein the controller is configured to, when a present maximum lift phase is different from a predetermined start stage maximum lift phase at engine start, correct the operation angle in accordance with the present maximum lift phase.

3. An intake valve control apparatus according to claim 2, wherein the controller is configured to, when the present maximum lift phase is on an advance side of the start stage maximum lift phase, increase-correct the operation angle.

4. An intake valve control apparatus according to claim 3, wherein the controller is configured to correct the operation angle so that the larger the difference between the present maximum lift phase and the start stage maximum lift phase becomes, the larger an increase-correction amount of the operation angle becomes.

5. An intake valve control apparatus according to claim 3, wherein the controller is configured to limit an operation angle after increase-correction to a predetermined operation angle that is smaller than a maximum operation angle of the first variable valve operating mechanism.

6. An intake valve control apparatus according to claim 2, wherein the predetermined start stage maximum lift phase is a most retarded maximum lift phase attained when the second variable valve operating mechanism is at a most retarded phase position.

7. An intake valve control apparatus according to claim 6, further comprising a holding mechanism that holds the second variable valve operating mechanism at the most retarded phase position during engine stoppage.

8. An intake valve control apparatus according to claim 2, wherein the controller is configured to store a maximum lift phase at engine stoppage and perform correction of an operation angle by regarding the stored maximum lift phase as a present maximum lift phase.

9. An intake valve control apparatus according to claim 1, wherein the controller is configured to correct the maximum lift phase in accordance with the present operation angle when the operation angle is different from the predetermined start stage operation angle at engine start.

10. An intake valve control apparatus according to claim 9, wherein the controller is configured to, when the present operation angle is larger than the start stage operation angle, advance-correct the maximum lift phase.

11. An intake valve control apparatus according to claim 10, wherein the controller is configured to control the advance-correction amount of the maximum lift phase so that the larger the difference between the present operation angle and the start stage operation angle becomes, the larger an advance-correction amount of the maximum lift phase becomes.

12. An intake valve control apparatus according to claim 10, wherein the maximum lift phase after advance-correction is limited so as to be within a predetermined advance range that is on a retard side of the most advanced maximum lift phase of the second variable valve operating mechanism.

13. An intake valve control apparatus according to claim 9, wherein the minimum operation angle of the first variable valve operating mechanism is the start stage operation angle.

14. An intake valve control apparatus according to claim 13, further comprising a holding mechanism for holding the first variable valve operating mechanism at a minimum operation angle position during engine stoppage.

15. An intake valve control apparatus according to claim 9, wherein the controller is configured to store an operation angle at engine stoppage and perform correction of a maximum lift phase by regarding the stored operation angle as a present operation angle.

16. An intake valve control apparatus according to claim 1, wherein the controller is configured to correct the phase position of the other of the first and second variable valve operating mechanisms during cranking by means of a cranking motor.

17. An intake valve control apparatus according to claim 16, wherein the controller is configured to inhibit injection of fuel for a predetermined period of time after correction of the phase position of the other of the first and second variable valve operating mechanisms is started.

18. An intake valve control apparatus for an internal combustion engine comprising:
- a first variable valve operating mechanism capable of varying an operation angle of an intake valve continuously;
- a second variable valve operating mechanism capable of varying a maximum lift phase of the intake valve continuously; and
- a controller that controls an intake air amount mainly by varying the operation angle and the maximum lift phase of the intake valve;
- the controller is configured to, when a valve closing timing of the intake valve is on an advance side of a predetermined start stage point at engine start, increase-correct an operation angle of the first variable valve operating mechanism and retard-correct a maximum lift phase of the second variable valve operating mechanism.

19. An intake valve control apparatus for an internal combustion engine comprising:
- a first variable valve operating mechanism capable of varying an operation angle of an intake valve continuously;
- a second variable valve operating mechanism capable of varying a maximum lift phase of the intake valve continuously; and
- a controller that controls an intake air amount mainly by varying the operation angle and the maximum lift phase of the intake valve;
- the controller is configured to, when a valve closing timing of the intake valve is on a retard side of a predetermined start stage point at engine start, decrease-correct an operation angle of the first variable valve operating mechanism and advance-correct a maximum lift phase of the second variable valve operating mechanism.

20. An intake valve control method for an internal combustion engine having a first variable valve operating mechanism capable of varying an operation angle of an intake valve continuously and a second variable valve operating mechanism capable of varying a maximum lift phase of the intake valve continuously, comprising:
- controlling an intake air amount mainly by varying the operation angle and the maximum lift phase of the intake valve;
- wherein the controlling includes, when one of the first and second variable valve operating mechanisms is at a phase position different from a predetermined start stage phase position at engine start, correcting a phase position of the other of the first and second variable valve operating mechanisms in accordance with a present phase position of the one of the first and second variable valve operating mechanisms.

21. An intake valve control method according to claim 20, wherein the controlling comprises, when a present maximum lift phase is different from a predetermined start stage maximum lift phase at engine start, correcting the operation angle in accordance with the present maximum lift phase.

22. An intake valve control method according to claim 21, wherein the controlling comprises, when the present maximum lift phase is on an advance side of the start stage maximum lift phase, increase-correcting the operation angle.

23. An intake valve control method according to claim 22, wherein the controlling comprises correcting the operation angle so that the larger the difference between the present maximum lift phase and the start stage maximum lift phase becomes, the larger an increase-correction amount of the operation angle becomes.

24. An intake valve control method according to claim 22, wherein the controlling comprises limiting an operation angle after increase-correction to a predetermined operation angle that is smaller than a maximum operation angle of the first variable valve operating mechanism.

25. An intake valve control method according to claim 21, wherein the predetermined start stage maximum lift phase is a most retarded maximum lift phase caused when the second variable valve operating mechanism is at a most retarded phase position.

26. An intake valve control method according to claim 21, wherein the controlling comprises storing a maximum lift phase at engine stoppage and performing correction of an operation angle by regarding the stored maximum lift phase as a present maximum lift phase.

27. An intake valve control method according to claim 20, wherein the controlling comprises correcting the maximum lift phase in accordance with the present operation angle when the operation angle is different from the predetermined start stage operation angle at engine start.

28. An intake valve control method according to claim 27, wherein the controlling comprises, when the present operation angle is larger than the start stage operation angle, advance-correcting the maximum lift phase.

29. An intake valve control method according to claim 28, wherein the controlling comprises controlling an advance-correction amount of the maximum lift phase so that the larger the difference between the present operation angle and the start stage operation angle becomes, the larger an advance-correction amount of the maximum lift phase becomes.

30. An intake valve control method according to claim 28, wherein the maximum lift phase after advance-correction is limited so as to be within a predetermined advance range that is on a retard side of the most advanced maximum lift phase of the second variable valve operating mechanism.

31. An intake valve control method according to claim 27, wherein the minimum operation angle of the first variable valve operating mechanism is the start stage operation angle.

32. An intake valve control method according to claim 27, wherein the controlling comprises storing an operation angle at engine stoppage and performing correction of a maximum lift phase by regarding the stored operation angle as a present operation angle.

33. An intake valve control method according to claim 20, wherein the controlling comprises correcting the phase position of the other of the first and second variable valve operating mechanisms during cranking by means of a cranking motor.

34. An intake valve control method according to claim 33, wherein the controlling comprises inhibiting injection of fuel for a predetermined period of time after correction of the phase position of the other of the first and second variable valve operating mechanisms is started.

* * * * *